US011356463B1

(12) United States Patent
Hodgman et al.

(10) Patent No.: US 11,356,463 B1
(45) Date of Patent: **\*Jun. 7, 2022**

(54) DETECTING MALICIOUS PROCESSES BASED ON PROCESS LOCATION

(71) Applicant: Rapid7, Inc., Boston, MA (US)

(72) Inventors: Roy Hodgman, Cambridge, MA (US); Oliver Keyes, Seattle, WA (US); Wah-Kwan Lin, Melrose, MA (US); Michael Scutt, Alexandria, VA (US); Timothy Stiller, White Post, VA (US)

(73) Assignee: Rapid7, Inc., Boston, MA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/574,659

(22) Filed: Sep. 18, 2019

Related U.S. Application Data

(63) Continuation of application No. 15/657,317, filed on Jul. 24, 2017, now Pat. No. 10,462,162.

(51) Int. Cl.
*H04L 29/06* (2006.01)
*H04L 9/40* (2022.01)

(52) U.S. Cl.
CPC ...... *H04L 63/1416* (2013.01); *H04L 63/1441* (2013.01)

(58) Field of Classification Search
CPC .............. H04L 29/06; H04L 29/06911; H04L 29/06918; H04L 29/06904; H04L 29/06877; H04L 63/14; H04L 63/145; H04L 63/1441; H04L 63/1416; G06F 21/55; G06F 21/56; G06F 21/577; G06F 21/12; G06F 21/561; G06F 21/566; G06F 21/565

USPC .............................. 726/23–25; 713/187–189
See application file for complete search history.

(56) References Cited

U.S. PATENT DOCUMENTS

| | | | |
|---|---|---|---|
| 8,176,555 B1 * | 5/2012 | Schreiner | G06F 21/566 726/23 |
| 8,621,233 B1 * | 12/2013 | Manadhata | G06F 21/56 709/224 |
| 8,898,276 B1 * | 11/2014 | Pimentel | H04L 67/2814 709/224 |
| 10,121,000 B1 | 11/2018 | Rivlin et al. | |
| 2011/0023118 A1 * | 1/2011 | Wright | G06F 21/554 726/23 |
| 2011/0239294 A1 | 9/2011 | Kim et al. | |
| 2012/0124030 A1 * | 5/2012 | Seetharama | G06F 12/0813 707/E17.061 |
| 2012/0330709 A1 * | 12/2012 | Khorsheed | G06Q 10/063114 705/7.17 |

(Continued)

OTHER PUBLICATIONS

Hu, Yi, et al. "Mining file repository accesses for detecting data exfiltration activities." Journal of Artificial Intelligence and Soft Computing Research 2 (2012). (Year: 2012).*

*Primary Examiner* — Saleh Najjar
*Assistant Examiner* — Khalid M Almaghayreh
(74) *Attorney, Agent, or Firm* — Ashwin Anand; Gabriel Gonzalez

(57) ABSTRACT

Methods and systems for detecting malicious processes. Methods described herein gather data regarding process locations and calculate one or more inequality indicators related to the process paths based on economic principles. Instances of inequality with respect to process paths may indicate a path is uncommon and therefore the associated binary is used for malicious purposes.

20 Claims, 4 Drawing Sheets

(56) References Cited

U.S. PATENT DOCUMENTS

| | | | | |
|---|---|---|---|---|
| 2013/0030761 A1* | 1/2013 | Lakshminarayan | ................. | G06F 11/0709 702/179 |
| 2014/0006375 A1* | 1/2014 | Forte | ................. | G06F 8/71 707/758 |
| 2015/0101047 A1* | 4/2015 | Sridhara | ................. | H04L 63/1433 726/23 |
| 2015/0278518 A1* | 10/2015 | Pereira | ................. | G06F 21/554 726/23 |
| 2015/0302198 A1* | 10/2015 | Payne | ................. | G06F 21/562 726/23 |
| 2016/0203316 A1* | 7/2016 | Mace | ................. | G06F 21/55 726/23 |
| 2016/0285894 A1* | 9/2016 | Nelms | ................. | H04L 63/145 |
| 2016/0330226 A1* | 11/2016 | Chen | ................. | H04L 29/06877 |
| 2016/0350165 A1* | 12/2016 | LeMond | ................. | G06F 11/0787 |
| 2016/0357958 A1* | 12/2016 | Guidry | ................. | G06F 21/53 |
| 2018/0218153 A1* | 8/2018 | Edwards | ................. | G06F 21/566 |

\* cited by examiner

| | hash | path | path_count |
|---|---|---|---|
| 0 | 00043debdb9ec3d2545aa23ef6f8f43105d877e0 | c:\windows\system32\dism.exe | 17 |
| 1 | 00105dfcea62a137bd96c0f6caa97098cf991395 | c:\program files\realtek\audio\hda\ravcpl64.exe | 126 |

FIG. 3

| | path_trim | path_count |
|---|---|---|
| 0 | c:\windows\syswow64\dllhost.exe | 10086333 |
| 1 | c:\program files (x86)\google\chrome\applicati... | 7408206 |
| 2 | c:\windows\system32\searchfilterhost.exe | 6528091 |

FIG. 4

| | path_trim | path_count | $windows.~bt | .. | .babun | .ba | .cr | .dllcache | ... | zjd0tv4q.7xs | zoom |
|---|---|---|---|---|---|---|---|---|---|---|---|
| 0 | c:\windows\syswow64\dllhost.exe | 10086333 | 0 | 0 | 0 | 0 | 0 | 0 | ... | 0 | 0 |
| 1 | c:\program files (x86)\google\chrome\applicati... | 7408206 | 0 | 0 | 0 | 0 | 0 | 0 | ... | 0 | 0 |
| 2 | c:\windows\system32\searchfilterhost.exe | 6528091 | 0 | 0 | 0 | 0 | 0 | 0 | ... | 0 | 0 |

FIG. 5

| hash | path_trim | path_count |
|---|---|---|
| 688875b638ab1b98a99a3ba024a0f9e60a8f7b3b | program files\rapid7\nexpose\nsc\nxpgsql\pgsql\bin\postgres.exe | 315454 |
| 2009c5f046dd3asfldc4dfe475b01cc1d4fc285c | users\XXXXXX\appdata\local\citrix\gotomeeting\8039\g2mupdate.exe | 34533 |
| 04df49cd2e42685b3557c11f57e2d19c8896e976 | users\XXXXXX\appdata\local\citrix\gotomeeting\5822\g2mupdate.exe | 19516 |
| 5b2ea705824ef2e47b79fbefc70f7aaff474c36d | program files (x86)\google\update\googleupdate.exe | 16154 |

FIG. 6

| name | path | process_launch_count | distinct_paths | concentration |
|---|---|---|---|---|
| GoogleUpdate.exe | c:\program files (x86)\google\update\googleupd... | 8498 | 614 | 0.740791 |
| DropboxUpdate.exe | c:\program files (x86)\dropbox\update\dropboxu... | 24167 | 85 | 0.796547 |
| GoogleUpdate.exe | c:\program files (x86)\google\update\googleupd... | 18921 | 30 | 0.747479 |

DETECTING MALICIOUS PROCESSES BASED ON PROCESS LOCATION

The present application claims the benefit of U.S. utility patent application Ser. No. 15/657,317, filed on Jul. 24, 2017, and issued as U.S. Pat. No. 10,462,162 on Oct. 29, 2019, the entire disclosure of which is incorporated by reference as if set forth in its entirety herein.

TECHNICAL FIELD

Embodiments described herein generally relate to systems and methods for detecting malicious processes and, more particularly but not exclusively, to systems and methods for detecting malicious processes based on locations from which they are launched using economic principles.

BACKGROUND

Existing techniques for identifying malicious processes are generally rules-based and rely on human-defined lists of malicious binaries and processes. These existing methods are inherently reactive and often advance only after significant delay following the spread of malicious processes.

In other words, these techniques rely on previous occurrences of malicious processes to detect subsequent malicious processes. Accordingly, these techniques may be useful only after malicious processes have already caused harm to existing systems or assets.

A need exists, therefore, for methods and systems that are more proactive in identifying malicious processes.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying malicious processes. The method includes receiving, using an interface, at least one path indicating where a process was launched; parsing, using an analysis module executing instructions stored on a memory, the at least one path into at least one individual component; computing, using the analysis module, at least one inequality indicator for the at least one path to determine whether the process is malicious; and isolating the process upon determining the process is malicious.

In some embodiments, the at least one inequality indicator is at least one of a Herfindahl index and a Gini coefficient. In some embodiments, an inequality indicator exceeding a predetermined threshold indicates an instance of inequality and therefore indicates a process is uncommon and potentially malicious.

In some embodiments, the at least one inequality indicator is based on an identified pattern across multiple paths. In some embodiments the pattern is identified autonomously and is not previously defined.

In some embodiments, the method further includes removing, using the analysis module, at least one individual component from the at least one path. In some embodiments, removing the at least one individual component comprises removing at least one individual component that is present less than a predetermined number of times in the at least one path. In some embodiments, the removed at least one individual component is a username or a string specific to an instance of a computing environment.

In some embodiments, isolating the malicious process includes relocating the malicious process to a quarantine module for analysis.

In some embodiments, isolating the malicious process includes elevating the malicious process for examination.

According to another aspect, embodiments relate to a system for identifying malicious processes. The system includes an interface configured to receive at least one path indicating where a process was launched; a memory; and an analysis module configured to execute instructions stored on the memory to: parse the at least one path into at least one individual component; compute at least one inequality indicator for the at least one path to determine whether the process is malicious; and isolate a process upon determining the process is malicious.

In some embodiments, the at least one inequality indicator is at least one of a Herfindahl index and a Gini coefficient. In some embodiments, an inequality indicator exceeding a predetermined threshold indicates an instance of inequality and therefore indicates a process is uncommon and potentially malicious In some embodiments, the at least one inequality indicator is based on an identified pattern across multiple paths. In some embodiments, the pattern is identified autonomously and is not previously defined.

In some embodiments, the analysis module is further configured to remove at least one individual component from the at least one path. In some embodiments, the analysis module removes at least one individual component that is present less than a predetermined number of times in the at least one path. In some embodiments, the removed at least one individual component is a username or a string specific to an instance of a computing environment.

In some embodiments, the isolated process is relocated to a quarantine module for analysis.

In some embodiments, isolating the malicious process includes elevating the malicious process for manual examination.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 3 depicts exemplary path data of particular processes in accordance with one embodiment;

FIG. 4 depicts exemplary path data of particular processes in accordance with another embodiment;

FIG. 5 depicts the exemplary path data of FIG. 4 in a binarized form in accordance with one embodiment;

FIG. 6 depicts exemplary reconstructed path data after removing unique elements in accordance with one embodiment;

DETAILED DESCRIPTION

Figure 1:
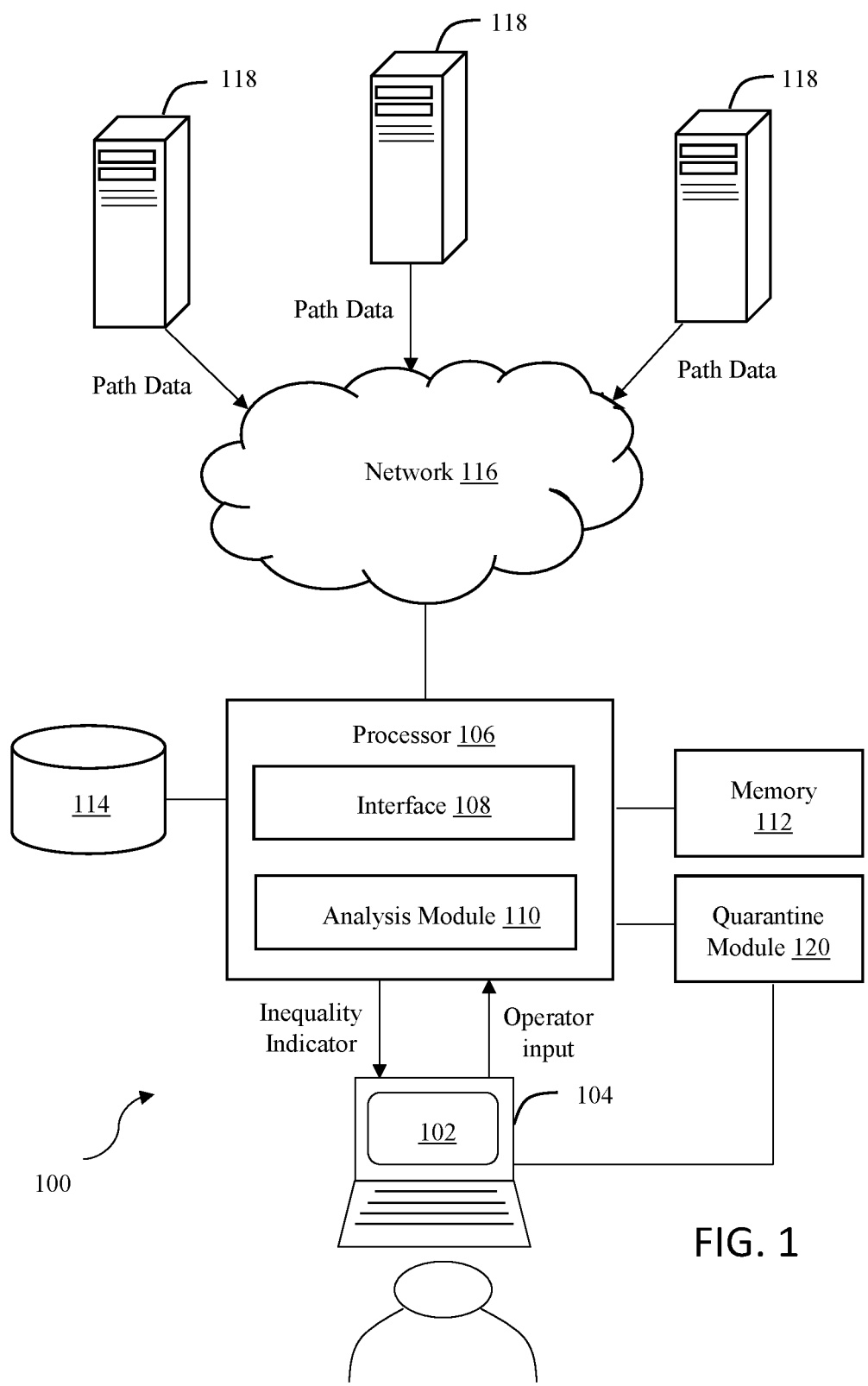
FIG. 1 illustrates a system for identifying malicious processes in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Processes of various operating systems generally are started from binaries located in standard file locations. These binaries may exist on a disk and can be uniquely identified based on their hash and/or their name. When a binary is executed, an operating system starts a process which can have a unique process identifier (PID). However, when these binaries are launched from uncommon locations, it may indicate that they are being used for malicious purposes.

It may therefore be desirable to analyze the locations from which processes are launched as they may indicate that a process is malicious (i.e., the binary is being used for a malicious purpose). Accordingly, features of various embodiments of systems and methods described herein collect data on processes and their respective locations across multiple devices and perform some remedial action when one or more processes deviate from the norm.

In other words, methods and systems described herein identify malicious processes based on patterns derived from wide-ranging observations. In contrast, many existing techniques rely on comparisons to lists or sets of previously identified malicious processes. Accordingly, features of various embodiments described herein identify malicious processes in a manner that is more proactive than existing techniques.

To identify certain patterns and therefore identify malicious processes (i.e., the binary that launched the process is being used for a malicious purpose), embodiments described herein apply anomaly and inequality detection methods that originate with economics. These techniques can be used to derive measurements to highlight instances of inequality and therefore possible malicious activity.

For example, methods and systems described herein may apply a Herfindahl calculation to each unique process. Herfindahl concentration calculations are typically utilized in the space of industrial economics to assess market concentrations. An extreme Herfindahl concentration value of "0" indicates high market competition in which many firms have equal shares of the market. At the other extreme, a Herfindahl concentration value of "1" indicates a monopoly-like scenario in which one firm has full control of the entire market.

Applying this calculation to embodiments described herein, a measure that is close to a monopolistic state but not quite equal to a monopoly (i.e., a Herfindahl concentration value near "1") implies a greater likelihood that a process is malicious. Essentially, process path concentrations are analogous to market share concentrations in the context of industrial economics. That is, cases in which particular processes are mostly concentrated within particular paths, with a few exceptions, would yield Herfindahl concentration values close to 1.

In addition to or in lieu of applying a Herfindahl calculation, methods and systems described herein may apply a Gini coefficient calculation to each unique process as determined by the associated binary name and/or hash. In economics, the Gini coefficient is used to measure wealth distribution inequality. A value close to "1" implies high inequality in which a relatively few individuals own most of the wealth. A value close to "0" implies low inequality in which wealth is fairly evenly distributed.

Applying this Gini coefficient calculation to the embodiments described herein, a high Gini coefficient indicates that most processes are heavily concentrated in particular paths. Deviations therefore suggest a binary is used for a malicious purpose.

For example, a Windows® binary cmd.exe might reflect a high Gini coefficient if most of its occurrences originate from path "c:\windows", with a few exceptions that originate from "c:\desktop\." The latter scenario might arise if a malicious actor surreptitiously duplicated a copy of cmd.exe to a path that is, for example, subject to fewer system controls.

While the Herfindahl concentration and the Gini coefficient are calculated differently, they both compute some measure of inequality. Accordingly, the Herfindahl concentration and the Gini coefficient may suggest that a particular process is characterized by a degree of inequality. This degree of inequality can then be used to infer that the use of a non-malicious binary could be for malicious purposes.

For cases in which a process reflects a high degree of inequality and therefore indicates that a particular binary is being used for a malicious purpose, the systems and methods described herein may isolate the process and/or elevate the process for a more manual, human examination. An operator can then analyze certain contextual information regarding its execution. For example, an operator may determine if the process launched other processes, if it changed files on a disk, or if it connected to a network or the internet, for example. Under human examination, the isolated cases may be dismissed as innocuous or treated as malicious and addressed accordingly.

FIG. 1 illustrates a system 100 for identifying malicious processes in accordance with one embodiment. The system 100 may include a user interface 102 executing on a device 104 that is in communication with a processor 106. The processor 106 may include a processor interface 108 and an analysis module 110.

The processor 106 may also be in operable communication with memory 112 storing instructions and one or more database modules 114. The processor 106 may be part of one or more networks 116 to gather process path data from one or more network assets 118. The system 100 may also include a quarantine module 120 used for isolating malicious processes.

The user interface 102 executing on a device 104 may be any type of interface accessible by an operator such as security personnel, a network administrator, or the like (hereinafter "operator"). The user interface 102 may enable the operator to, for example, submit queries and view data regarding processes and their locations. The user interface 102 may also allow an operator to input parameters, receive inequality indicator values for particular processes, and manually examine a particular process. The user interface 102 may be a web application or other suitable interface and may be presented on a device 104 such as, for example, a PC, laptop, tablet, mobile device, or the like.

The processor 106 may be any hardware device capable of executing the analysis module 110 to analyze the received process path data and to calculate the inequality indicators based on the received process path data. The processor 106 may be a microprocessor, a field programmable gate array (FPGA), an application-specific integrated circuit (ASIC), or other similar device. In some embodiments, such as those relying on one or more ASICs, the functionality described as being provided in part via software may instead be configured into the design of the ASICs and, as such, the associated software may be omitted. The processor 106 may be configured as part of the device 104 on which the user interface 102 executes, such as a laptop, or may be located at some remote location.

The processor interface 108 may enable the processor 106 to receive process path data from one or more network assets 118. The processor interface 106 may then communicate the received path data to the analysis module 110.

The analysis module 110 may execute one or more rules stored on memory 112 to analyze the received process path data. For example, the analysis module 110 may perform the required computations to calculate the inequality indicators such as the Herfindahl concentrations and Gini coefficients.

The memory 112 may be L1, L2, L3 cache or RAM memory configurations. The memory 112 may include non-volatile memory such as flash memory, EPROM, EEPROM, ROM, and PROM, or volatile memory such as static or dynamic RAM, as discussed above. The exact configuration/type of memory 112 may of course vary as long as instructions for at least calculating inequality indicators for processes can be executed by the processor 106.

The database module 114 may store a variety of types of data related to network assets 118, processes, process path locations, calculated inequality indicators, or the like. Data collected such as process path data may be uploaded to one or more storage services at predetermined time intervals (e.g., once every hour).

The network or networks 116 may link the various devices with various types of network connections. The network(s) 116 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 116 may also comprise, include, or interface to any one or more of a Wireless Application Protocol (WAP) link, a WI-FI link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a BLUETOOTH radio link, or an IEEE 802.11-based link.

The network assets 118 may be any type of entity on or otherwise in communication with the network 116. The network assets 118 may include, for example, an operating system, a service, a browser, a piece of software, a hardware device, or the like.

The system 100 may also include or otherwise be in communication with a quarantine module 120. The quarantine module 120 may be part of a demilitarized zone (DMZ), i.e., a physical or logical subnetwork exposed to access from an outside network. If a process is identified as malicious, it may be moved to the quarantine module 120 for analysis so as to not harm other components in the system 100. An operator may access or otherwise analyze processes stored in the quarantine module 120 using the interface 102 to gather contextual-related information related to the process (es) as discussed above.

Figure 2:
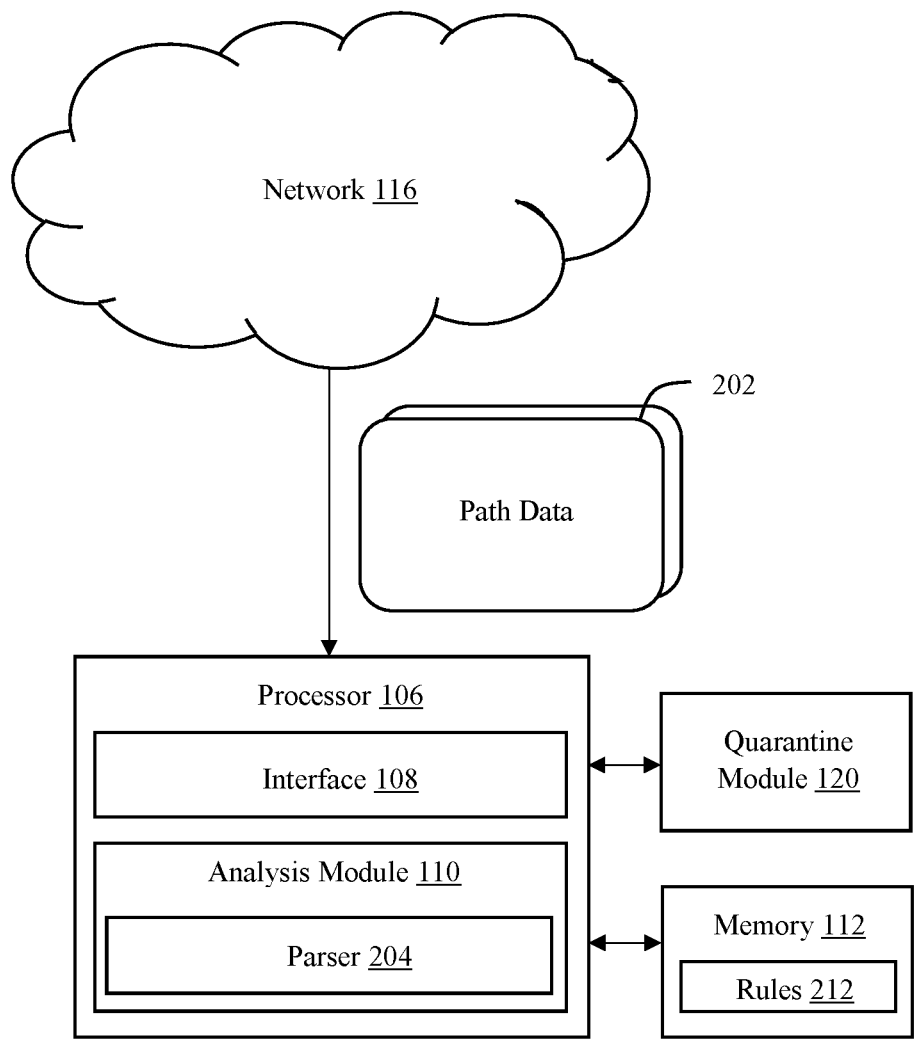
FIG. 2 illustrates the processor of FIG. 1 receiving process path data in accordance with one embodiment.

FIG. 2 illustrates the processor 106 of FIG. 1 in more detail. For example, the processor 106 is seen receiving path data 202 over the network 116, and the analysis module 110 is illustrated as including a parser 204.

The path data 202 may include raw data on processes and their paths on numerous assets 118 spread across one or more organizational entities. The processor 106 may actively query the network asset(s) 118 or passively monitor one or more actions by the asset(s) 118 and thereby gather data regarding various executing processes. FIG. 3, for example, depicts exemplary process path data 300 in accordance with one embodiment. This data 300 may be collected across multiple computers and devices over some window of time.

The processes may each be represented by a hash that is unique to each binary. For example, program.exe of version 1 would have its own hash, version 2 would have another, etc. The data 300 may include data on particular processes, the paths of the processes, and counts of how often certain hash-path combinations arise in a dataset.

FIG. 4 illustrates exemplary path data 400 in accordance with another embodiment. As seen in FIG. 4, the data 400 includes paths of processes as well as the number of times each path occurs in a dataset.

The analysis module 110 may be configured to binarize the path data. This is an intermediate step to help identify and remove elements of paths that are unique. In the context of the present application, the term "unique" may refer to a path element that is not useful in identifying patterns across multiple paths.

This step may be performed by the parser 204 of the analysis module 110. The identified and removed elements may include, for example, individual usernames, strings specific to an instance of a computing environment, or the like. Then, the analysis module 110 may aggregate the counts of process names and process path frequency in the overall dataset under analysis after the unique components are removed.

FIG. 5 illustrates the data of FIG. 4 in binarized form 500. It is noted that the binarized data 500 shown in FIG. 5 only shows a portion of the data of FIG. 4 in binarized form. In use, the binarized data 500 may include hundreds or thousands of elements that are useful in identifying patterns.

The analysis module 110 may then reconstruct the path and hash combinations after the unique elements are removed. For example, if users BSmith and JSmith run processX.exe from \user\BSmith\ . . . \processX.exe and \user\JSmith\ . . . \processX.exe, respectively, then this would produce a count of 2 for processX.exe running from relative path \user\XXXXXXXX\ . . . \process.exe.

The analysis module 110 may then provide a count of how many times the reconstructed path and hash combinations occur in the dataset. FIG. 6 illustrates exemplary data 600 of reconstructed paths along with the associated path counts.

The analysis module 110 may then calculate the inequality indicator values based on the data 600 of FIG. 6. In use, there may be cases where processX.exe runs from path\A\B\C 90% of the time. However, there may be a small percentage of times where process X.exe runs from path \A\F. This would yield a relatively large Herfindahl concentration value (i.e., close to "1").

Figures 7, 8:
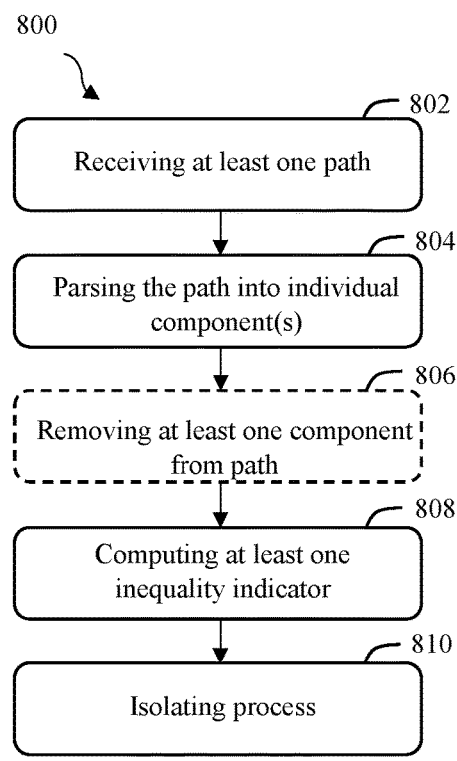
FIG. 7 depicts exemplary path data and associated inequality indicator values in accordance with one embodiment.
FIG. 8 depicts a flowchart of a method for identifying malicious processes in accordance with one embodiment.

FIG. 7 presents exemplary data 700 showing calculated Herfindahl concentration values. For example, the first row of the data 700 indicates the process in the first row was run 8,498 times across different devices. Moreover, the process of the first row of data 600 was launched from 614 different paths. The Herfindahl concentration shown in the last column indicates that most of the occurrences of the corresponding process started from the same place. However, there was a certain minority proportion that did not start from that most common path.

The processes that did not originate from the most common path may then be flagged or otherwise marked for further review or isolation. An operator may then manually review the flagged processes.

FIG. 8 depicts a flowchart of a method 800 for identifying malicious processes in accordance with one embodiment. Step 802 involves receiving at least one path indicating where a process was launched. This may be a process executed on a network asset such as the network asset(s) 118 of FIG. 1. Data regarding the process(es) may be received by an interface such as the processor interface 108 of FIG. 1. The received data may include, for example, the path from which the process was launched and the binary that launched the process.

Step 804 involves parsing the at least one path into at least one individual component. This step may be performed by the parser 204 of FIG. 2, for example. Step 804 is essentially a pre-processing step that breaks the path data into individual components.

Step 806 is optional and involves removing, using the analysis module, at least one individual component from the at least one path. Step 806 may be performed to remove components from a path that are not useful in detecting malicious processes. As mentioned previously, these may be unique components of a process path. These may include, for example, usernames or strings specific to an instance of a computing environment.

Step 808 involves computing at least one inequality indicator. The analysis module of FIG. 1 may compute the inequality indicator to determine whether the process is malicious. The inequality indicator(s) may include at least one of the Herfindahl index and/or a Gini coefficient.

Step 810 involves isolating the process (e.g., if it is still running on the device from which it is launched) upon determining the process is malicious. Additionally, the binary that launched the process can be isolated if the process has terminated For example, if the process is associated with a Herfindahl concentration above a threshold and/or a Gini coefficient above a threshold, the analysis module 110 may conclude the process is malicious or least likely malicious.

Any flagged processes may be communicated to a quarantine module such as the quarantine module 120 of FIG. 1. The flagged process may then be presented to an operator via the user interface 102. The operator may then perform any further examinations with respect to the context of the execution of the process or perform some other remedial action.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for identifying malicious processes, the method comprising:
   receiving a first dataset comprising data regarding a plurality of processes, binary files from which the plurality of processes were launched, and paths of the plurality of binary files across multiple assets of an organization;
   binarizing the data to produce binarized data;
   identifying, using the binarized data, at least one type of path element to remove from the data, wherein the at least one type of path element comprises username information;
   removing the at least one type of path element from the data to produce a second dataset, wherein the second dataset comprises reconstructed paths in which the paths from the first dataset do not include the at least one type of path element;
   calculating, using the second dataset, an inequality indicator for each process of the plurality of processes, wherein the inequality indicator is a Herfindahl index that represents a relative frequency between a process launching from a binary file located at a particular path of the reconstructed paths, compared with the process launching from the binary file located at other paths of the reconstructed paths;
   determining, based at least in part on the inequality indicators, that a particular process, of the plurality of processes, is malicious; and
   performing at least one remedial action upon determining the particular process is malicious.

2. The method of claim 1, wherein the inequality indicator is based on an identified pattern across multiple paths of the binary files.

3. The method of claim 2, wherein the pattern is identified autonomously and is not previously defined.

4. The method of claim 1, wherein the at least one type of path element further comprises a string specific to an instance of a computing environment.

5. The method of claim 1, wherein performing the at least one remedial action includes isolating the malicious process by relocating the malicious process to a quarantine module for analysis.

6. The method of claim 1, wherein performing the at least one remedial action includes elevating the malicious process for examination.

7. The method of claim 1, further comprising:
actively querying network assets of the organization to gather data regarding executing processes.

8. The method of claim 1, further comprising:
passively monitoring one or more actions by network assets of the organization to gather data regarding executing processes.

9. The method of claim 1, wherein the data further comprises a hash that is unique to each binary file of the binary files.

10. The method of claim 9, wherein the data further comprises counts of how often certain hash-path combinations arise in the first dataset.

11. A system for identifying malicious processes, the system comprising:
a memory; and
a hardware processor configured to execute instructions stored on the memory to:
receive a first dataset comprising data regarding a plurality of processes, binary files from which the plurality of processes were launched, and paths of the plurality of binary files across multiple assets of an organization;
binarize the data to produce binarized data;
identify, using the binarized data, at least one type of path element to remove from the data, wherein the at least one type of path element comprises username information;
remove the at least one type of path element from the data to produce a second dataset, wherein the second dataset comprises reconstructed paths in which the paths from the first dataset do not include the at least one type of path element;
calculate, using the second dataset, an inequality indicator for each process of the plurality of processes, wherein the inequality indicator is a Herfindahl index that represents a relative frequency between a process launching from a binary file located at a particular path of the reconstructed paths, compared with the process launching from the binary file located at other paths of the reconstructed paths;
determine, based at least in part on the inequality indicators, that a particular process, of the plurality of processes, is malicious; and
perform at least one remedial action upon determining the particular process is malicious.

12. The system of claim 11, wherein the inequality indicator is based on an identified pattern across multiple paths of the binary files.

13. The system of claim 12, wherein the pattern is identified autonomously and is not previously defined.

14. The system of claim 11, wherein the at least one type of path element further comprises a string specific to an instance of a computing environment.

15. The system of claim 11, wherein the hardware processor is configured to perform the at least one remedial action by relocating the malicious process to a quarantine module for analysis.

16. The system of claim 11, wherein the hardware processor is configured to perform the at least one remedial action by elevating the malicious process for examination.

17. The system of claim 11, wherein the hardware processor is further configured to:
actively query network assets of the organization to gather data regarding executing processes.

18. The system of claim 11, wherein the hardware processor is further configured to:
passively monitor one or more actions by network assets of the organization to gather data regarding executing processes.

19. The system of claim 11, wherein the data further comprises a hash that is unique to each binary file of the binary files.

20. The system of claim 19, wherein the data further comprises counts of how often certain hash-path combinations arise in the first dataset.

* * * * *